(12) United States Patent
Zaheer

(10) Patent No.: US 9,075,704 B2
(45) Date of Patent: Jul. 7, 2015

(54) MITIGATING RISKS DURING A HIGH AVAILIBILITY AND DISASTER RECOVERY (HA/DR) REHEARSAL

(71) Applicant: HEWLETT-PACKARD DEVELOPMENT COMPANY, L.P., Houston, TX (US)

(72) Inventor: Mudasser Asif Zaheer, Missouri City, TX (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 189 days.

(21) Appl. No.: 13/750,333

(22) Filed: Jan. 25, 2013

(65) Prior Publication Data

US 2014/0215255 A1 Jul. 31, 2014

(51) Int. Cl.
  *G06F 11/00* (2006.01)
  *G06F 11/34* (2006.01)
  *G06F 11/30* (2006.01)

(52) U.S. Cl.
  CPC .......... *G06F 11/004* (2013.01); *G06F 11/3409* (2013.01); *G06F 11/3051* (2013.01)

(58) Field of Classification Search
  None
  See application file for complete search history.

(56) References Cited

U.S. PATENT DOCUMENTS

| | | | |
|---|---|---|---|
| 5,014,220 A * | 5/1991 | McMann et al. | 706/45 |
| 5,655,074 A * | 8/1997 | Rauscher | 714/38.1 |
| 7,127,477 B2 | 10/2006 | Duncombe et al. | |
| 7,191,438 B2 | 3/2007 | Bryant | |
| 7,260,818 B1 * | 8/2007 | Iterum et al. | 717/170 |
| 7,539,907 B1 * | 5/2009 | Johnsen et al. | 714/47.2 |
| 8,359,491 B1 * | 1/2013 | Bloomstein | 714/6.3 |
| 8,850,272 B2 * | 9/2014 | Pasala et al. | 714/47.1 |
| 8,949,653 B1 * | 2/2015 | Kayan et al. | 714/1 |
| 2002/0077800 A1 * | 6/2002 | Kampe | 703/21 |
| 2009/0138860 A1 * | 5/2009 | Fusegawa et al. | 717/131 |
| 2011/0283146 A1 * | 11/2011 | Nemecek et al. | 714/37 |
| 2012/0191439 A1 | 7/2012 | Meagher et al. | |
| 2013/0198370 A1 * | 8/2013 | Aguchi et al. | 709/224 |

OTHER PUBLICATIONS

Goel, Amrit L., "Software Reliability Models: Assumptions, Limitations, and Applicability", IEEE, 1985.*
Wang et al., "Architecture-based software reliability modeling", Elsevier, 2005.*
"Company"; 2012; DBORA Consulting (M) Sdn Bhd; http://www.dbora-consulting.com/AboutUs.aspx.
Murthy, V. et al.; "Oracle Exalytics In-memory Machine: a Brief Introduction"; Oct. 2011; http://www.oracle.com/us/solutions/ent-performance-bi/business-intelligence/exalyt.
Smith, C.; "Power I Forecast: Directions in High Availability"; Feb. 6, 2012; http://www.mcpressonline.com/high-availability-/-disaster-recovery/power-i-forecast-direction.

* cited by examiner

*Primary Examiner* — Gabriel Chu
(74) *Attorney, Agent, or Firm* — Van Cott, Bagley, Cornwall & McCarthy

(57) ABSTRACT

A method of mitigating risks during a high availability and disaster recovery (HA/DR) rehearsal comprises, with a processor, performing a number of checks on a number of applications to determine the operational performance of the applications, and with the processor, determining if the applications comprise design patterns that indicate potential HA/DR risks.

19 Claims, 8 Drawing Sheets

Scorecard: Operational Rating

| | Criteria | Measure | Weight | Result | Score |
|---|---|---|---|---|---|
| 1 | Complies with S2S requirements (MC and EE only) | S2S Certified: Y=1, N=0 | 25% | NOTES | 23% |
| 2 | Complies with Z2Z requirements (MC only) | Z2Z Certified: Y=1, N=0 | 15% | NOTES | 10% |
| 3 | Required rehearsals are conducted successfully | 95% Successful: Y=1, N=0 | 15% | NOTES | 10% |
| 4 | Recovery from production outages within RTO and RPO | 95% Successful: Y=1, N=0 | 8% | NOTES | 4% |
| 5 | Completed the HA/DR Health Check within the past 3 years | Y=1, N=0 | 8% | Y | 8% |
| 6 | External (non-application) Health Checks are in place | Layer 7 (L)=.5, GSLB (G)=.5 | 6% | NOTES | 2% |
| 7 | All DCC Exceptions have been remediated | Y=1, N=0 | 6% | NOTES | 5% |
| 8 | Key application support team has HA/DR training | Y=1, N=0 | 6% | Y | 6% |
| 9 | Support agreements in place | Y=1, N=0 | 6% | Y | 6% |
| 10 | System patching up-to-date (within two revisions of standard) and consistent across sites and zones | Y=1, N=0 | 5% | Y | 5% |
| | | FY2011 Score | >61% | ★★★ | 79% |

Fig. 6

Scorecard: Design Rating

| | Criteria | Measure | Weight | Result | Score |
|---|---|---|---|---|---|
| 1 | Rich CLI (Command Line Interface) | Y=1, N=0 | 4% | Y | 4% |
| 2 | Connection Management | Y=1, N=0 | 8% | Y | 8% |
| 3 | Data Management | Y=1, N=0 | 9% | NOTES | 8% |
| 4 | Documentation | Y=1, N=0 | 5% | Y | 5% |
| 5 | Failure Management | Fail Fast (F)=.3, Restartability (R)=.7 | 8% | NOTES | 7% |
| 6 | Indirection | Hard Coding: Y=1, N=0 | 9% | N | 9% |
| 7 | Performance Testing Tools | Y=1, N=0 | 8% | NOTES | 8% |
| 8 | Recoverable state design | Sticky Sessions (s)=.2, Other (O)=1 | 8% | NOTES | 6% |
| 9 | Redundancy/Cluster-aware design | Active/Active (a)=1, Active/Passive (P)=.5 | 14% | NOTES | 8% |
| 10 | Transaction-aware design | Y=1, N=0 | 8% | NA | 8% |
| 11 | Version Migration | Live update for all tiers: Y=1, N=0 | 5% | NOTES | 3% |
| 12 | "Watcher Friendly" design and heartbeats | Heartbeats: (.3); Identifiable Services: (.3); Persistent Processes (.3); Structure Logs: (.1) | 14% | NOTES | 10% |
| | | FY2011 Score | >74% | ★★★★ | 84% |

*Fig. 7*

MITIGATING RISKS DURING A HIGH AVAILABILITY AND DISASTER RECOVERY (HA/DR) REHEARSAL

BACKGROUND

With an increased use of computer technologies in almost every sector of the world economy, the need for high availability and disaster recovery within a computing infrastructure has also increased. A computing infrastructure generally should be made available at any time so that users may access the resources and data within the infrastructure, or receive continued services they are contracted to receive from the computing infrastructure. However, there are instances when a computing infrastructure or a portion thereof experiences some level of downtime; periods when a computing infrastructure is unavailable.

This downtime may occur when maintenance is performed within the technology infrastructure including, for example, patches to system software that require a reboot, or system configuration changes that only take effect upon a reboot. This type of downtime may be referred to as scheduled downtime, and is usually the result of some logical, management-initiated event. Downtime may also arise from some physical event, such as a hardware or software failure, or environmental anomaly. This type of downtime may be referred to as unscheduled downtime, and may include, for example, power outages, failed hardware components, an over-temperature related shutdown, logically or physically severed network connections, catastrophic security breaches, or various software failures such as failures in an application or an operating system.

BRIEF DESCRIPTION OF THE DRAWINGS

The accompanying drawings illustrate various examples of the principles described herein and are a part of the specification. The illustrated examples are given merely for illustration, and do not limit the scope of the claims.

FIG. 6 is a screenshot of an operational rating scorecard, according to one example of the principles described herein.

FIG. 7 is a screenshot of a design rating scorecard, according to one example of the principles described herein.

Throughout the drawings, identical reference numbers designate similar, but not necessarily identical, elements.

DETAILED DESCRIPTION

Figure 1:
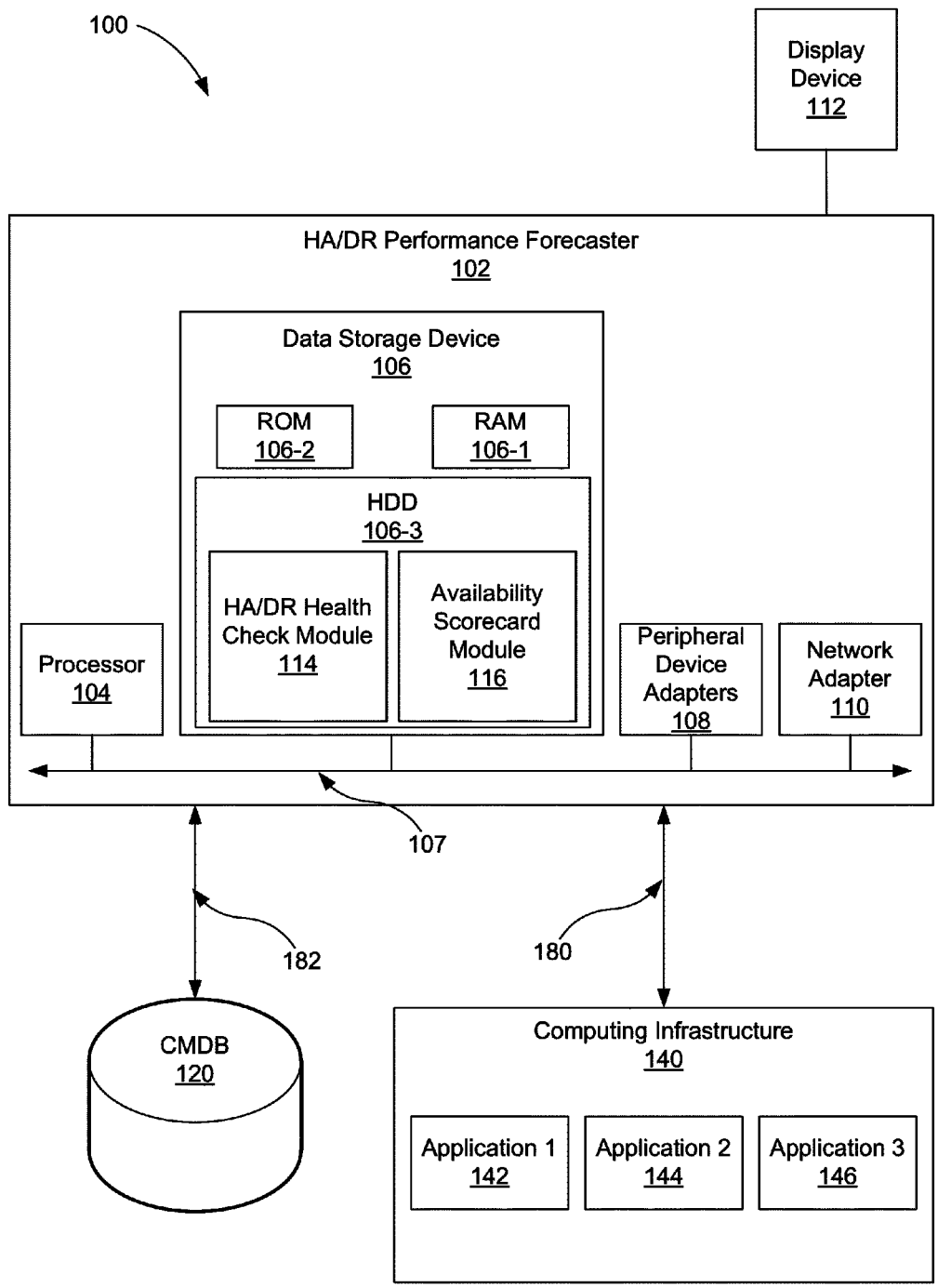
FIG. 1 is a diagram of a HA/DR performance forecasting system, according to one example of the principles described herein.

As described above, both scheduled and unscheduled downtime instances may occur in which a computing infrastructure may be unavailable to users. Further, both scheduled and unscheduled downtime instances cause the owner of the computing infrastructure to hire more employees to alleviate the downtime instance, upgrade, or purchase new hardware or software, and constantly monitor the computing infrastructure, for example. This can create a significant loss in revenue associated with the computing infrastructure. Further, downtime can create a loss of trust in the computing infrastructure; whether the user is associated with the entity that owns the computing infrastructure or is a client of services provided by the computing infrastructure.

Therefore the present application describes a method of mitigating risks during a high availability and disaster recovery (HA/DR) rehearsal comprises, with a processor, performing a number of checks on a number of applications to determine the operational performance of the applications, and with the processor, determining if the applications comprise design patterns that indicate potential HA/DR risks. Further, the present application describes a system for mitigating risks within a computing infrastructure, comprising a high availability and disaster recovery (HA/DR) performance forecaster.

The HA/DR performance forecaster comprises a processor, and a data storage device, in which the data storage device comprises a HA/DR health check module that, when executed by the processor, performs a number of checks on a number of applications to determine the operational performance of the applications, and a availability scorecard module that, when executed by the processor, determines if the applications comprise design patterns that indicate potential HA/DR risks. The system further comprises a configuration management database to store data relating to the operational performance of the applications as determined by the HA/DR health check module.

Still further, the present application describes a computer program product for mitigating risks during a high availability and disaster recovery (HA/DR) rehearsal. The computer program product comprises a computer readable storage medium comprising computer usable program code embodied therewith. The computer usable program code comprises computer usable program code to, when executed by a processor, perform a number of checks on a number of applications to determine the operational performance of the applications, computer usable program code to, when executed by a processor, store data relating to the operational performance of the applications in a database, and computer usable program code to, when executed by a processor, determine if the applications comprise design patterns that indicate potential HA/DR risks based on the stored data.

A high availability and disaster recovery (HA/DR) system is a computing system that assists with maintaining a computing infrastructure at an allowable level of uptime and prepare for recovery or continuation of the computing infrastructure after a natural or human-induced disaster. However, owners and administrators of computing infrastructures may be concerned about whether high availability and disaster recovery (HA/DR) solutions really work when activated. HA/DR architects may attempt to address the possibility of an HA/DR system by designing and implementing an unrelenting regiment of downtime rehearsals or drills that are designed to mitigate any unnecessary downtime.

HA/DR rehearsals are disruptive tasks that result in costly downtime. These rehearsals are also resource intensive and may require substantial coordination between the various stakeholders including various database administrators, third party application vendors, and the owners of the computing infrastructure, among others. In some instances, IT organizations that schedule regularly recurring rehearsals in a monthly or quarterly basis, for example, may be incurring unnecessary costs. Conversely, those IT organizations that conduct rehearsals only after a major change event may be exposing themselves to unmitigated risk.

Thus, while performing a number of HA/DR rehearsals can significantly mitigate potential risks, these rehearsals are extremely disruptive to normal operations, resulting in lost productivity and usually unacceptable financial cost. Further, in some instances, the rehearsal may not be able to perform as indented, and downtime may exceed what was expected. This additional downtime above the expected time is even more costly. The present application discloses an HA/DR performance forecaster that uses a combination of tools and methodologies to predict the performance of a number of applications in the event of an outage or complete disaster. This performance information can then be used to optimize rehearsals by adjusting the frequency and type of rehearsals based on the performance forecast for the application.

As used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

FIG. 1 is a diagram of a HA/DR performance forecasting system (100), according to one example of the principles described herein. In one example, the HA/DR performance forecasting system (100) is a computing device that performs the methods described herein within a networking environment. In this example, the networking environment may be a network of a number of computers, an internet, an intranet, or the Internet. The networking environment may also comprise a cloud network environment including, for example, a private cloud network, a public cloud network, or a hybrid cloud network, among others. In another example, the networking environment may be a mobile network environment. In still another example, the networking environment may be a virtualized network environment.

In one example, the HA/DR performance forecasting system (100) may be embodied within and executable on, for example, a mobile computing device such as, for example, a mobile phone, smart phone, personal digital assistant (PDA), or a laptop computer with the capability of performing the methods described herein. In another example, the HA/DR performance forecasting system (100) may be embodied within and executable on a desktop computing environment, among other computing devices.

The HA/DR performance forecasting system (100) may comprise a number of components including a HA/DR performance forecaster (102), a configuration management database (CMDB) (120) communicatively coupled to the HA/DR performance forecaster (102), and an external computing infrastructure (140) communicatively coupled to the HA/DR performance forecaster (102). The computing infrastructure (140) comprises a number of target computing devices upon which the HA/DR performance forecaster (102) is to perform HA/DR performance forecasting, as will be described in more detail below.

The connections (180, 182) between the HA/DR performance forecaster (102) and the computing infrastructure (140) and between the HA/DR performance forecaster (102) and the CMDB (120) may be via a number of intermediary computing devices such as, for example, a number of servers. In another example, the connections (180, 182) may be direct connections with no intermediary computing devices.

To achieve its desired functionality, the HA/DR performance forecaster (102) comprises various hardware components. Among these hardware components may be at least one processor (104), at least one data storage device (106), peripheral device adapters (108), and a network adapter (110). These hardware components may be interconnected through the use of a number of busses and/or network connections. In one example, the processor (104), data storage device (106), peripheral device adapters (108), and a network adapter (110) may be communicatively coupled via bus (107).

The processor (104) may include the hardware architecture that retrieves executable code from the data storage device (106) and execute the executable code. The executable code may, when executed by the processor (104), cause the processor (104) to implement at least the functionality of predicting performance of an IT organization's HA/DR framework across a number of applications according to the methods of the present specification described below. In the course of executing code, the processor (104) may receive input from and provide output to a number of the remaining hardware units described herein.

The data storage device (106) may store data such as executable program code that is executed by the processor (104) or other processing device. As will be discussed, the data storage device (106) may specifically store a number of applications that the processor (104) executes to implement at least the functionality of predicting performance of an IT organization's HA/DR framework across a number of applications.

The data storage device (106) may include various types of memory modules, including volatile and nonvolatile memory. For example, the data storage device (106) of the present example includes Random Access Memory (RAM) (106-1), Read Only Memory (ROM) (106-2), and Hard Disk Drive (HDD) memory (106-3). Many other types of memory are available in the art, and the present specification contemplates the use of many varying type(s) of memory in the data storage device (106) as may suit a particular application of the principles described herein. In certain examples, different types of memory in the data storage device (106) may be used for different data storage needs. For example, in certain examples the processor (104) may boot from Read Only Memory (ROM) (106-2), maintain nonvolatile storage in the Hard Disk Drive (HDD) memory (106-3), and execute program code stored in Random Access Memory (RAM) (106-1).

Generally, the data storage device (106) may comprise a computer readable storage medium. For example, the data storage device (106) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The hardware adapters (108, 110) in the HA/DR performance forecaster (102) enable the processor (104) to interface with various other hardware elements, external and internal to the HA/DR performance forecaster (102). For example, peripheral device adapters (108) may provide an interface to input/output devices, such as, for example, display device (112), to create a user interface and/or access external devices such as, for example, the CMDB (120), and computing infrastructure (140). Peripheral device adapters (108) may also create an interface between the processor (104) and a printer, the display device (112), or other media output device. As will be described below, a number of output devices may interact with and implement the functionality of the HA/DR performance forecaster (102).

The network adapter (110) may provide an interface to a number of other computing devices or networks included within the networking environment, thereby enabling the transmission of data between the HA/DR performance forecaster (102), and other devices such as, for example, the CMDB (120) and the computing infrastructure (140) and its number of computing devices and resources. The external computing infrastructure (140) as depicted in FIG. 1 may be any number of computing devices to which the HA/DR performance forecaster (102) is communicatively coupled. In one example, the computing infrastructure (140) comprises computing devices that execute a number of applications (142, 144, 146). These applications (142, 144, 146) are monitored by the HA/DR performance forecaster (102) as will be described in more detail below. Even though three applications are depicted in FIG. 1, any number of applications may be present and executed within the computing infrastructure (140).

The HA/DR performance forecasting system (100) of FIG. 1 further comprises the configuration management database (CMDB) (120). The CMDB (120) is any database that stores information regarding a number of components of a networking environment and the computing devices or systems making up the networking environment. In one example, the CMDB contains data regarding a number of the applications (142, 144, 146) executed within the computing infrastructure (140). In one example, this data is numeric scores that indicate recommendations for improving the design of the applications (142, 144, 146) to affect operational performance.

Turning again to the HA/DR performance forecaster (102) of FIG. 1, the data storage device (106) may store an HA/DR health check module (114) and an availability scorecard module (116). In one example, the HA/DR health check module (114) and the availability scorecard module (116) may be stored in the HDD (106-3), as depicted in FIG. 1. However, any data storage device may be used to store these modules (114, 116).

The HA/DR health check module (114), when executed by the processor (104), performs a number of checks on a number of applications to determine the operational performance of the applications, creates a database of data relating to the operational performance of the applications, and produces and displays a number of dashboards associated with the applications (142, 144, 146) executable on the computing infrastructure (140). The HA/DR health check module (114) will be described in more detail below.

The availability scorecard module (116) determines if the applications comprise design patterns that indicate potential HA/DR risks, and produces and displays a number of scorecards associated with the applications (142, 144, 146). The availability scorecard module (116) will be described in more detail below.

As will be described in more detail below, the HA/DR performance forecaster (102) produces output to a user that may be used in a variety of ways. In one example, the HA/DR performance forecaster (102) output can be used internally to improve HA/DR preparedness. In another example, the HA/DR performance forecaster (102) output can be used externally to share with an audit organization, to prove compliance and achieve certification.

The HA/DR performance forecaster (102), its various elements, and its functionality may be implemented in a number of network scenarios. In one example, the HA/DR performance forecaster (102) may be executed by, for example, a consultant. In this example, the consultant remotely or directly connects the HA/DR performance forecaster (102) to the computing infrastructure (140) owned by the entity for whom the consultant has been hired. The consultant's HA/DR performance forecaster (102) may be embodied as a desktop computing device, a laptop computing device, a personal digital assistant (PDA), a mobile cellular device such as a smart phone, among others.

In another example, the HA/DR performance forecaster (102) may be implemented via a network such as, for example, the Internet by a service provider. In this example, the services provided by the service provider's HA/DR performance forecaster (102) may be provided as an infrastructure as a service (IaaS), platform as a service (PaaS), software as a service (SaaS), storage as a service (STaaS), security as a service (SECaaS), data as a service (DaaS), database as a service (DBaaS), test environment as a service (TEaaS), among others, or combinations thereof. The service provider's HA/DR performance forecaster (102) may be embodied as a number of servers, a desktop computing device, a laptop computing device, a personal digital assistant (PDA), a mobile cellular device such as a smart phone, among others.

The HA/DR performance forecaster (102) may be implemented with respect to a number of applications (142, 144, 146) stored on the computing infrastructure (140). The applications (142, 144, 146) may represent an application portfolio, and the application portfolio may be scored along with the individual applications (142, 144, 146) as will be described in more detail below.

Figure 2:
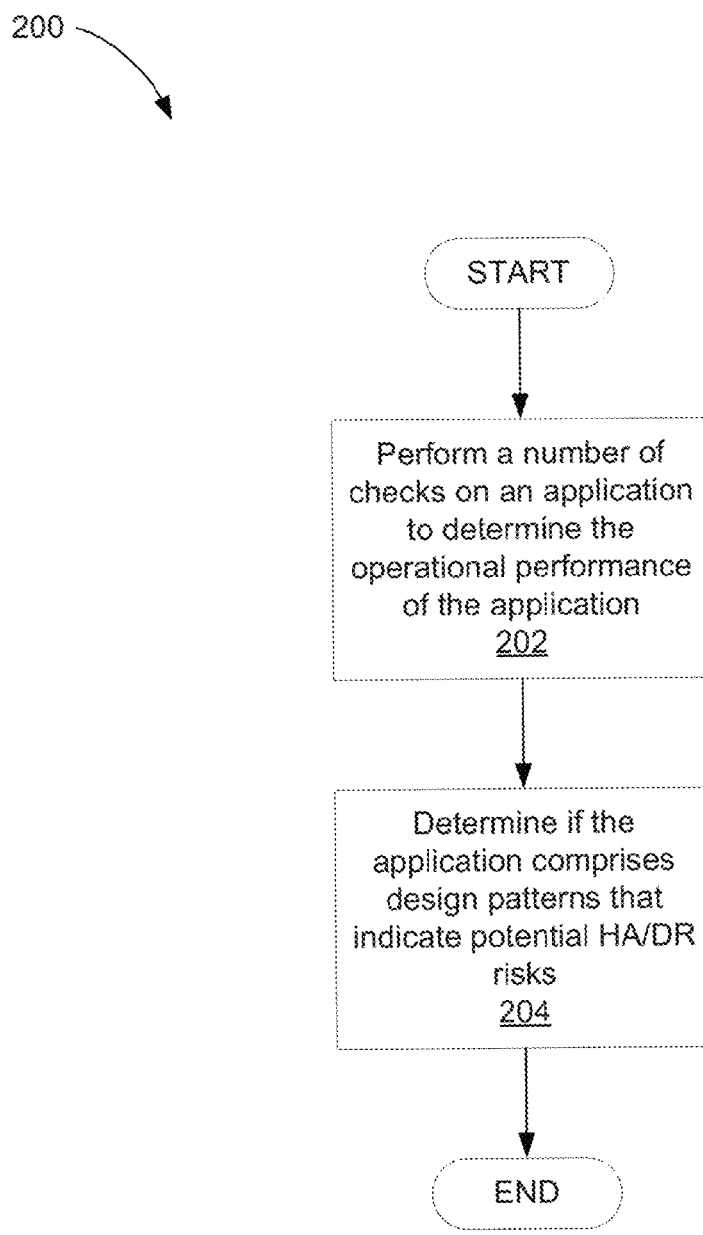
FIG. 2 is a flowchart showing a HA/DR performance forecasting method, according to one example of the principles described herein.

FIG. 2 is a flowchart (200) showing a HA/DR performance forecasting method, according to one example of the principles described herein. The method of FIG. 2 may begin by the processor (104), executing the HA/DR health check module (114), performing (block 202) a number of checks on a number of the applications (142, 144, 146) to determine the operational performance of the applications (142, 144, 146). The processor (104), executing the availability scorecard module (116), determines (block 204) if the application (142, 144, 146) comprises design patterns that indicate potential HA/DR risks. Some details surrounding the method of FIG. 2 will now be described in connection with FIG. 3.

Figure 3:
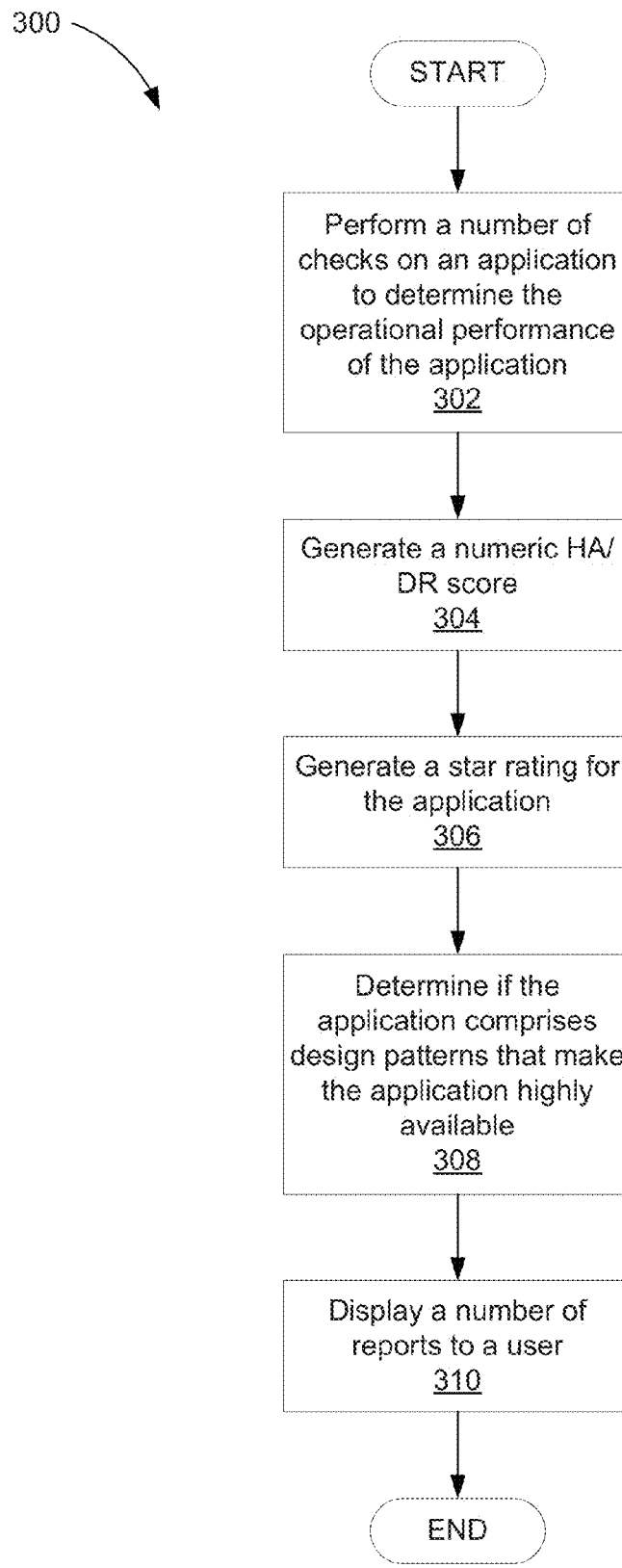
FIG. 3 is a flowchart showing a HA/DR performance forecasting method, according to another example of the principles described herein.

FIG. 3 is a flowchart (300) showing a HA/DR performance forecasting method, according to another example of the principles described herein. The method may begin by the processor (104), executing the HA/DR health check module (114), performing (block 302) a number of checks on a number of the applications (142, 144, 146) to determine the operational performance of the applications (142, 144, 146). The checks may be any number of HA/DR-related operational criteria such as, for example, the recovery time objective (RTO), the recovery point objective (RPO), and the rehearsal history. The checks may also be related to the rehearsal type such as, for example, failover and failback, failover and stay, among others. Still further, the checks may be related to types of health checks such as health checks related to Layer 7, among other types of health checks.

In one example, the processor (104) performs (block 304) the checks on all of the applications (142, 144, 146) within the computing infrastructure (140). In this example, block 302 is implemented with respect to the entire application portfolio within the computing infrastructure (140). In another example, the processor (104) performs (block 304) the checks on less than all of the applications (142, 144, 146) within the computing infrastructure (140).

The processor (104), executing the HA/DR health check module (114), generates (block 304) a numeric HA/DR score for all or a portion of the applications (142, 144, 146) within the computing infrastructure (140). This HA/DR score given to each application (142, 144, 146) takes into consideration factors such as the level of availability acceptable for an application (142, 144, 146) based on its level of criticality within the computing infrastructure (140). Level of criticality may include, for example, "normal," "entity essential" (EE), and "mission critical" (MC), among others.

The processor (104), executing the HA/DR health check module (114), also generates (block 306) a star rating for all or a portion of the applications (142, 144, 146) within the computing infrastructure (140). Like the HA/DR score generated at block 304, this star rating given to each application (142, 144, 146) takes into consideration factors such as the level of availability acceptable for an application (142, 144, 146) based on its level of criticality within the computing infrastructure (140). Level of criticality may include, for example, "normal," "entity essential" (EE), and "mission critical" (MC), among others.

The output of the execution of the HA/DR health check module (114) is a database of information regarding the applications (142, 144, 146) present on the computing infrastructure (140). In one example, the HA/DR score and star rating are stored in the configuration management database (CMDB) (120) for future use as will be described below. In one example, the CMDB (120) may be a relational database in which the HA/DR scores and star ratings, among other data associated with the applications (142, 144, 146), are the data items stored within the CMDB (120). In this example, these data items are organized as a set of formally described tables from which data can be accessed.

Figure 4:
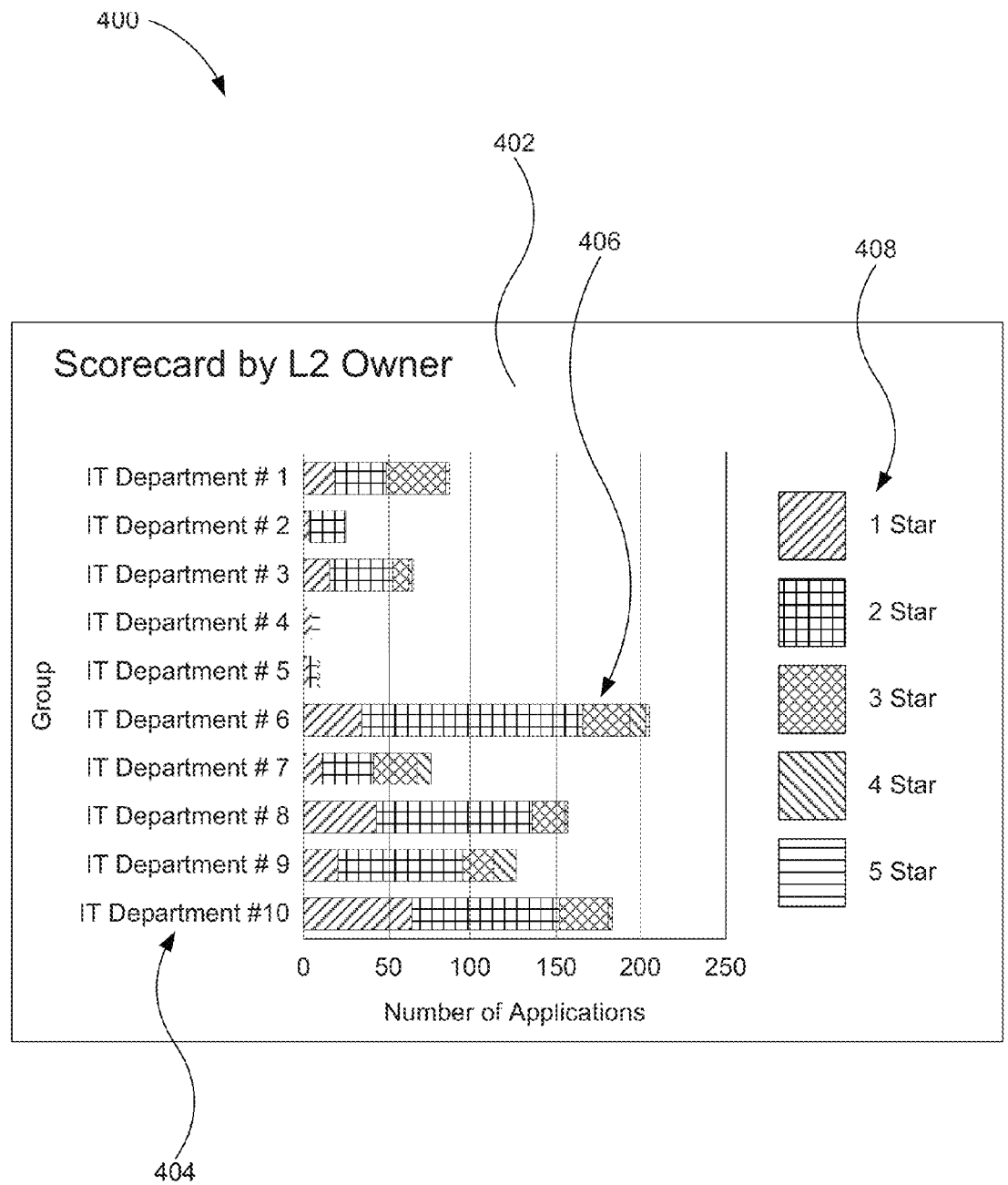
FIG. 4 is a screenshot of a dashboard pertaining to a portfolio of applications generated from the HA/DR health check module, according to one example of the principles described herein.
Figure 5:
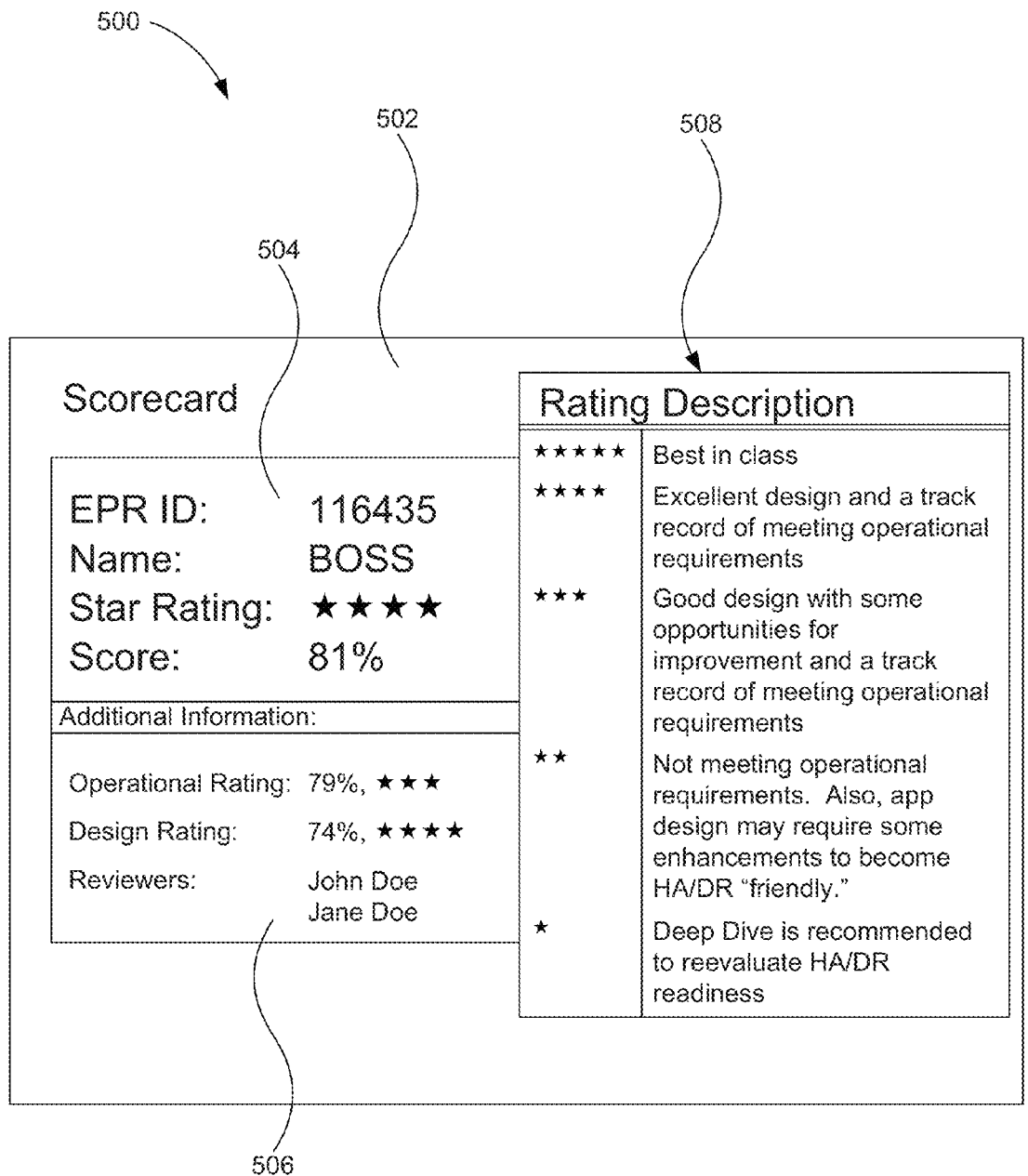
FIG. 5 is a screenshot of a dashboard pertaining to an application generated from the HA/DR health check module, according to one example of the principles described herein.

In another example, a number of dashboards may be generated and presented to a user via, for example, the display device (112). In one example, the processor (104) may display the dashboards to a user on the display device (112). FIGS. 4 and 5 are screenshots (400, 500) of some dashboards displayed on the display device (112). Specifically, FIG. 4 is a screenshot (400) of a dashboard (402) pertaining to a portfolio of applications (142, 144, 146) generated from the HA/DR health check module (114), according to one example of the principles described herein. The HA/DR health check module (114) may analyze a number of the applications (142, 144, 146) within the computing infrastructure (140), and, based on that analysis, generate the dashboard (402). The dashboard (402) grades the applications with an initial star rating from 1 to 5 stars, 1 star indicating a poor application, and 5 stars indicating a superior application.

The y-axis indicates the groups (404) of applications that are being analyzed using the present systems and methods. For example, the groups (404) may be divided based on IT departments, as depicted in FIG. 4. The x-axis indicates the number of applications analyzed within each group. The dashboard (402) may comprise a number of bars (406) and a key (408) that indicate what number of applications were given a 1 star rating, what number of applications were given a 2 star rating, etc. In this manner, the length of the bars (406) along the x-axis indicates the number of applications within a particular group (404), and the length of each of the subsections of a bar (406) indicate how many applications exist within that group that have a particular star rating based on the key (408). The dashboard (402) of FIG. 4 provides to a user information as to the how the applications (142, 144, 146) within the global application portfolio have a specific rating. This may, in turn, provide the user with an idea as to where resources may be focused to place these applications in better condition for an HA/DR rehearsal or an actual downtime instance. The example of FIG. 4 is an example of a dashboard (402). However, other dashboards may be generated and presented to a user in various formats.

FIG. 5 is a screenshot (500) of a dashboard (502) pertaining to an application (142, 144, 146) generated from the HA/DR health check module (114), according to one example of the principles described herein. The dashboard (502) may provide general information (504) and rating information (506) pertaining to a particular application (142, 144, 146). The rating description (508) may accompany the rating information (506). The rating information (508) assists a user in understanding the meaning of the rating information (506).

The processor (104), executing the availability scorecard module (116), determines (block 308) if the application (142, 144, 146) comprises design patterns that indicate potential HA/DR risks. For example, the availability scorecard module (116) determines (block 308) if the application (142, 144, 146) comprises design patterns that make the application highly available or not highly available. The availability scorecard module (116) utilizes the HA/DR scores and star ratings generated at blocks 304 and 306 to identify which of the applications (142, 144, 146) are potential risks to increasing downtime during an HA/DR rehearsal. The design evaluation of block 308 comprises determining key characteristics and design patterns that impact the HA/DR readiness of the applications (142, 144, 146). One example of key characteristics and design patterns may include version management that minimizes downtime when updating and patching the applications (142, 144, 146). Another example is transaction aware application design that preserves data integrity. For example, some transactions can be submitted multiple times with no loss of integrity such as in the example of an address update while other transactions cannot such as in the example of an account withdrawal.

The processor (104), executing the availability scorecard module (116), displays (block 310) a number of reports or scorecards to a user. In one example, the processor (104) displays (block 310) the reports to a user on the display device (112). FIG. 6 is a screenshot (600) of an operational rating scorecard (602), according to one example of the principles described herein. The operational rating scorecard (602) provides a user with an itemized operational rating of a particular application (142, 144, 146). Ten criteria (604) are presented in the example of FIG. 6. However, any number of criteria may be used to determine an overall operational rating (606) given to the application (142, 144, 146). Further, any number of parameters may be used to define the individual criteria (604).

These parameters may depend on the organization's goals and level of availability sought.

FIG. 7 is a screenshot (700) of a design rating scorecard (702), according to one example of the principles described herein. The design rating scorecard (702) provides a user with an itemized design rating of a particular application (142, 144, 146). Twelve design criteria (704) are presented in the example of FIG. 7. However, any number of criteria may be used to determine an overall design rating (706) given to the application (142, 144, 146). Further, any number of parameters may be used to define the individual design criteria (704). Again, these parameters may depend on the organization's goals and level of availability sought.

With regard to FIGS. 2 and 3, in one example, the method of FIGS. 2 and 3 may be implemented before an HA/DR rehearsal is performed. In this example, in order to alleviate any potential downtime that may occur above an expected downtime during the HA/DR rehearsal, the method of FIG. 2 is performed before such a rehearsal. In this manner, the chances of exceeding an expected downtime associated with the rehearsal may be reduced or eliminated. This is because the present systems and methods determine if any analyzed application (142, 144, 146) comprises deficiencies that may extend downtime of an application or otherwise stop one or more of the applications (142, 144, 146) from executing after initiation of the rehearsal. In another example, the method of FIGS. 2 and 3 may be implemented at the same frequency as the rehearsals, before each of the rehearsals are scheduled, or combinations thereof.

In this manner, the present systems and methods measure how effectively applications are operating in a current highly available environment across a number of websites. Further, the present systems and methods measure how effectively applications are operating in the current disaster recovery environment across, for example, geographic zones or regions. Still further, the present systems and methods evaluate aspects of application design that pertain to high availability and disaster recovery. Five star rating systems, along with numeric scores, are used to create scorecards that provide recommendations for improving application design to affect operational performance. The numeric scores are feed into the CMDB (120) or other corporate data warehouses to facilitate governance.

Figure 8:
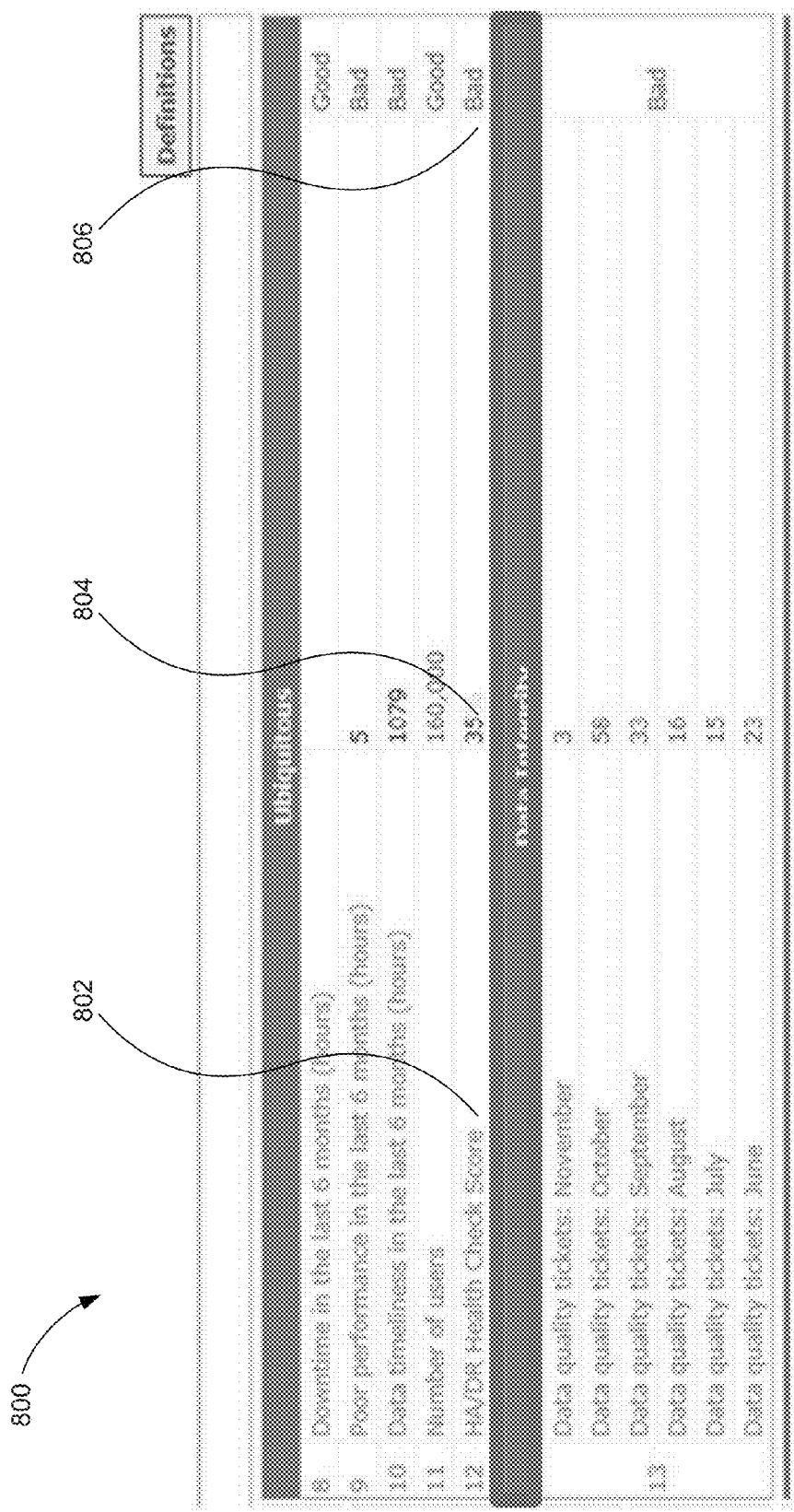
FIG. 8 is a screenshot of a global configuration management reporting portal, according to one example of the principles described herein.

A number of experiments were conducted using the present system indicating the effectiveness of the HA/DR performance forecaster (102). FIG. 8 is a screenshot (800) of a global configuration management reporting portal (802), according to one example of the principles described herein. The HA/DR performance forecaster (102) may be integrated into a service provided over a network such as, for example, the Internet. Thus, the HA/DR performance forecaster (102) may be integrated as an infrastructure as a service (IaaS), platform as a service (PaaS), software as a service (SaaS), storage as a service (STaaS), security as a service (SECaaS), data as a service (DaaS), database as a service (DBaaS), test environment as a service (TEaaS), among others, or combinations thereof. In one example, the HA/DR performance forecaster (102) may be integrated into a global IT service and configuration management process developed and offered as a service by Hewlett Packard Company. As depicted in FIG. 8, a HA/DR health check score (802) was given in this experiment. The score (804) was determined to be a 35. The global configuration management reporting portal (802) also indicates that the score (804) is "bad" as indicated by 806.

Further experimental data indicating the effectiveness of the present systems and methods are demonstrated in Table 1.

TABLE 1

Issues uncovered by the HA/DR performance forecaster (102)

| Application Name/ Description | Issue |
|---|---|
| Eclipse/manages pricing to online stores | Redo Apply delay set to 30 min. instead of 6 hours, meaning that data corruption protection for only 30 minutes instead of mandated six hours |
| PeopleSoft/global human resources application | Layer-7 Health Check utilizing default IIS Web Page instead of an App page, meaning that a portal outage will not trigger alerts |
| CReST/extended warranties and care pack services | 23 partner apps will experience data timeliness issue during an outage because they pull files from a single staging directory. The impact can be mitigated if file push capabilities or multiple staging directories were implemented |
| GCSS/service desk workflow manager | Application relies on another asset for critical processing which is High Availability or Disaster Recovery enabled |

As Table 1 demonstrates, the HA/DR performance forecaster (102) may return information about a number of applications. This information may include a number of issues detected by the HA/DR performance forecaster (102), and a number of possible fixes to place the applications in a condition that is less susceptible to lengthy downtime in the event of an HA/DR rehearsal or a real, unscheduled or unintended downtime event. Table 1 is only a sampling of some of the issues uncovered by the HA/DR performance forecaster (102) for a number of mission critical applications. Application administrators and system administrators were not aware of the issues discovered by the HA/DR performance forecaster (102). An outage may have resulted in failure of the certified HA/DR strategies for these applications. For some mission critical applications such as, for example, the Global Supply Chain, every hour of downtime may be equivalent to millions of dollars in lost revenue.

Aspects of the present system and method are described herein with reference to flowchart illustrations and/or block diagrams of methods, apparatus (systems) and computer program products according to examples of the principles described herein. Each block of the flowcharts and block diagrams, and combinations of blocks in the flowcharts and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (102) of the HA/DR performance forecaster (102) or other programmable data processing apparatus, implement the functions or acts specified in the flowchart and/or block diagram block or blocks. In one example, the computer usable program code may be embodied within a computer readable storage medium; the computer readable storage medium being part of the computer program product. In another example, the computer usable program code may be embodied in a non-transitory computer readable medium such as, for example a non-transitory computer readable storage medium. Examples of non-transitory computer readable medium may include an electronic, magnetic, optical, electromagnetic, infrared, or semiconductor system, apparatus, or device, or any suitable combination of the foregoing.

The specification and figures describe a method of mitigating risks during a high availability and disaster recovery (HA/DR) rehearsal comprises, with a processor, performing a number of checks on a number of applications to determine the operational performance of the applications, and with the processor, determining if the applications comprise design patterns that indicate potential HA/DR risks. Further, the specification and figures describe a system for mitigating risks within a computing infrastructure, comprising a high availability and disaster recovery (HA/DR) performance forecaster.

The HA/DR performance forecaster comprises a processor, and a data storage device, in which the data storage device comprises a HA/DR health check module that, when executed by the processor, performs a number of checks on a number of applications to determine the operational performance of the applications, and a availability scorecard module that, when executed by the processor, determines if the applications comprise design patterns that indicate potential HA/DR risks. The system further comprises a configuration management database to store data relating to the operational performance of the applications as determined by the HA/DR health check module.

Still further, the specification and figures describe a computer program product for mitigating risks during a high availability and disaster recovery (HA/DR) rehearsal. The computer program product comprises a computer readable storage medium comprising computer usable program code embodied therewith. The computer usable program code comprises computer usable program code to, when executed by a processor, perform a number of checks on a number of applications to determine the operational performance of the applications, computer usable program code to, when executed by a processor, store data relating to the operational performance of the applications in a database, and computer usable program code to, when executed by a processor, determine if the applications comprise design patterns that indicate potential HA/DR risks based on the stored data.

This system and method of mitigating risks during a high availability and disaster recovery (HA/DR) rehearsal may have a number of advantages, including significant savings and risk mitigation by providing operations teams and HA/DR architects with the data needed to conduct targeted rehearsals. Further, because disaster recovery rehearsals are expensive, the present systems and methods allow an entity to demonstrate a high level of maturity for disaster preparedness without the cost of traditional disaster recovery rehearsals. This enables the entity to obtain certifications and ensure compliance with strict standards. Auditors may be impressed with the entities that use the present (TITLE) as part of an ongoing assurance process. The present systems and methods further allow for administrator to do targeted rehearsal scheduling, provide additional parameters for escalation teams to determine the course of action during outages, and provide dashboards for technology and business executives to determine the health of their application portfolios and improve overall application availability.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method comprising:
   performing, by a system including a processor, checks on applications to determine operational performance of the applications;
   determining, by the system, whether the applications exhibit potential high availability and disaster recovery (HA/DR) risks by checking for design patterns in the applications, wherein the design patterns include at least one of version management that reduces downtime during an update, and a transaction-aware application design that preserves data integrity; and
   identifying, by the system based on the determining, at least one of the applications as a potential risk for increasing downtime during an HA/DR rehearsal of a computing infrastructure including the applications.

2. The method of claim 1, further comprising generating, based on the determining, a respective numeric HA/DR score for each corresponding application of the applications, the respective numeric HA/DR score computed based on a level of availability acceptable for the corresponding application.

3. The method of claim 1, further comprising generating, based on the determining, a respective star rating for each corresponding application of the applications.

4. The method of claim 1, further comprising storing data relating to the operational performance of the applications in a database.

5. The method of claim 4, further comprising determining, from the stored data, if the applications comprise the design patterns.

6. The method of claim 1, wherein the checks on the applications are performed on the applications executing within the computing infrastructure.

7. The method of claim 1, further comprising performing the HA/DR rehearsal after the identifying.

8. The method of claim 1, wherein operation of the system is a service provided by a service provider.

9. The method of claim 1, further comprising:
   adjusting, by the system, a frequency of performing HA/DR rehearsals of the computing infrastructure based on the identifying.

10. The method of claim 1, further comprising:
    generating, by the system, a graphical view containing respective indications of the HA/DR risks of the applications.

11. The method of claim 10, wherein the graphical view contains a bar having a length indicating a number of the applications, and the bar is divided into a plurality of the segments having different graphical indicators that correspond to different HA/DR risks of the applications.

12. A system for mitigating risks within a computing infrastructure, comprising:
    a high availability and disaster recovery (HA/DR) performance forecaster, comprising:
      at least one processor;
      a HA/DR health check module executable by the at least one processor to perform checks on applications to determine operational performance of the applications; and
      an availability scorecard module executable by the at least one processor to:
        forecast whether the applications exhibit potential HA/DR risks by checking for design patterns in the applications, wherein the design patterns include at least one of version management that reduces downtime during an update, and a transaction-aware application design that preserves data integrity, and
        identify, based on the forecasting, at least one of the applications as a potential risk for increasing downtime during an HA/DR rehearsal of the computing infrastructure in which the applications are executed; and a configuration management database to store data relating to the operational performance of the applications as determined by the HA/DR health check module.

13. The system of claim 12, wherein the HA/DR performance forecaster is communicatively coupled to the computing infrastructure.

14. The system of claim 12, wherein the HA/DR performance forecaster is provided as an infrastructure as a service (IaaS), platform as a service (PaaS), software as a service (SaaS), storage as a service (STaaS), security as a service (SECaaS), data as a service (DaaS), database as a service (DBaaS), test environment as a service (TEaaS), or combinations thereof with respect to the computing infrastructure.

15. The system of claim 12, wherein the HA/DR performance forecaster is to adjust a frequency or type of HA/DR rehearsals performed by the computing infrastructure based on the identifying.

16. The system of claim 12, wherein the HA/DR performance forecaster is to generate a graphical view containing respective indications of the HA/DR risks of the applications.

17. A non-transitory computer readable storage medium comprising instructions that upon execution cause a system to:

perform checks on applications to determine operational performance of the applications;

determine whether the applications exhibit potential high availability and disaster recovery (HA/DR) risks by checking for design patterns in the applications, wherein the design patterns include at least one of version management that reduces downtime during an update, and a transaction-aware application design that preserves data integrity; and identify, based on the determining, at least one of the applications as a potential risk for increasing downtime during an HA/DR rehearsal of a computing infrastructure in which the applications are executed.

18. The non-transitory computer readable storage medium of claim 17, wherein the instructions upon execution cause the system to further:

generate, based on the determining, measures of the HA/DR risks of the applications.

19. The non-transitory computer-readable storage medium of claim 17, wherein the instructions upon execution cause the system to:

adjust a frequency or type of HA/DR rehearsals of the computing infrastructure based on the identifying.

* * * * *

UNITED STATES PATENT AND TRADEMARK OFFICE
CERTIFICATE OF CORRECTION

| | | |
|---|---|---|
| PATENT NO. | : 9,075,704 B2 | |
| APPLICATION NO. | : 13/750333 | |
| DATED | : July 7, 2015 | |
| INVENTOR(S) | : Mudasser Asif Zaheer et al. | |

It is certified that error appears in the above-identified patent and that said Letters Patent is hereby corrected as shown below:

On the title page, item (54) and in the specification, column 1, line 2, Title, delete "AVAILIBILITY" and insert -- AVAILABILITY --, therefor.

In the claims

In column 14, line 18 approx., in Claim 19, delete "computer-readable" and insert -- computer readable --, therefor.

Signed and Sealed this
Ninth Day of August, 2016

Michelle K. Lee
*Director of the United States Patent and Trademark Office*